United States Patent [19]

Ichikawa

[11] Patent Number: 4,988,164
[45] Date of Patent: Jan. 29, 1991

[54] ANTI-REFLECTION FILM FOR SYNTHETIC RESIN OPTICAL ELEMENTS

[75] Inventor: Hajime Ichikawa, Sagamihara, Japan
[73] Assignee: Olympus Optical Co., Ltd., Japan
[21] Appl. No.: 332,809
[22] Filed: Apr. 3, 1989

[30] Foreign Application Priority Data

Apr. 25, 1988 [JP]  Japan ............................... 63-102287

[51] Int. Cl.$^5$ ................................................ G02B 1/10
[52] U.S. Cl. ..................................... 350/165; 350/164
[58] Field of Search ................. 350/164, 165; 351/166

[56] References Cited

U.S. PATENT DOCUMENTS

| | | | |
|---|---|---|---|
| 3,799,653 | 3/1974 | Ikeda | 350/164 |
| 3,811,753 | 5/1974 | Onoki et al. | 351/166 X |
| 4,130,672 | 12/1978 | Onoki et al. | 350/164 X |
| 4,497,539 | 2/1985 | Sakurai et al. | 350/164 |
| 4,599,272 | 7/1986 | Ichikawa | 350/164 X |
| 4,609,267 | 9/1986 | Deguchi et al. | 351/166 X |
| 4,784,467 | 11/1988 | Akatsuka et al. | 350/164 X |

FOREIGN PATENT DOCUMENTS

| | | | |
|---|---|---|---|
| 225101 | 11/1985 | Japan . | |
| 081404 | 4/1988 | Japan | 350/164 |

*Primary Examiner*—Bruce Y. Arnold
*Assistant Examiner*—David R. Parsons
*Attorney, Agent, or Firm*—Bruce L. Adams; Van C. Wilks

[57] ABSTRACT

An anti-reflective film for synthetic resin optical parts of elements. The film comprises a first SiO layer, a second SiO$_2$ layer, a third CeO$_2$ layer and a fourth SiO$_2$ layer, each layer having a particular optical thickness at a wavelength of $\lambda = 400$–$700$ nm.

4 Claims, 4 Drawing Sheets

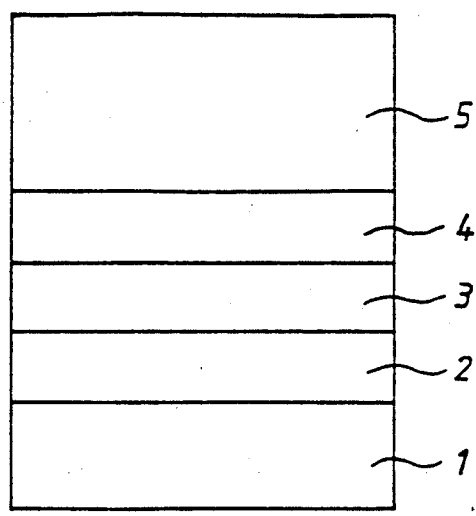
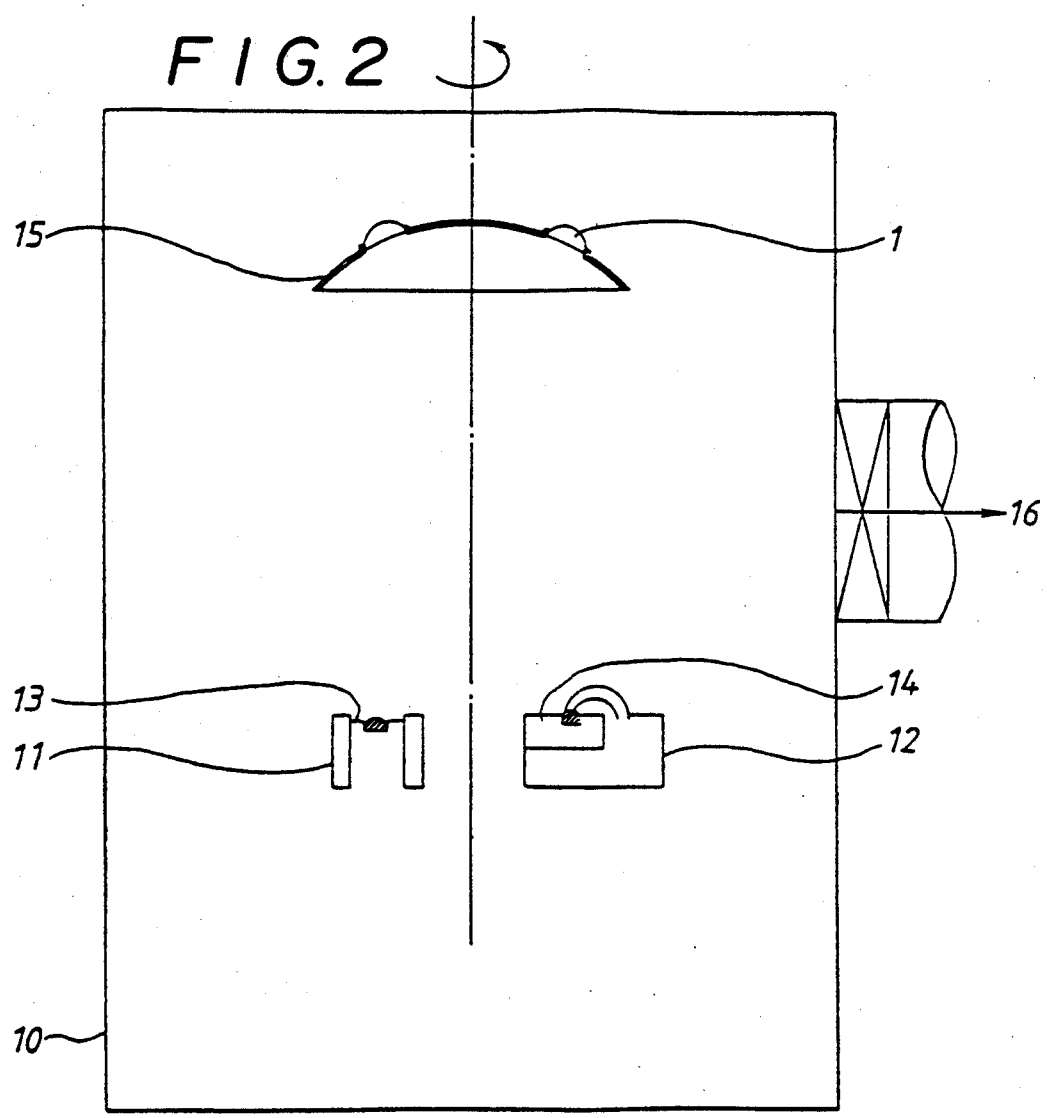

ANTI-REFLECTION FILM FOR SYNTHETIC RESIN OPTICAL ELEMENTS

BACKGROUND OF THE INVENTION

1. Field of the Invention

This invention relates to a reflection-preventive film for optical parts of synthetic resin.

2. Related Art Statement

Recently, synthetic resins having a light weight and which are easy to work with have frequently been used as a material for optical elements or parts such as lenses and the like instead of inorganic glass. However, the optical parts made from the synthetic resin are highly reflective and inorganic glass is soft, so that there is a problem that the surface is apt to be scratched. Therefore, it is necessary that a reflection-preventive film simultaneously serving as a curing protection be formed on the surface of the optical part made of synthetic resin.

The reflection-preventive film is usually formed by a vacuum deposition process. In the case of an inorganic glass substrate, a durable deposited film is obtained by heating the substrate at 200°–400° C. However, when the synthetic resin is heated at 200°–400° C., it is degraded and decomposed, so that the formation of the deposited film is impossible through substrate heating as with the inorganic glass.

Therefore, as disclosed, for example, in Japanese Patent laid open No. 60-225,101, the formation of the reflection-preventive film onto the surface of the synthetic resin substrate has hitherto been conducted without the heating of the substrate. This reflection-preventive film formed on the surface of the synthetic resin substrate has, for example, a five layer structure obtained by alternately and repeatedly laminating a $SiO_2$ layer and a $Ta_2O_5$ layer, wherein the $SiO_2$ layer is first deposited on the substrate surface by a resistor heating process of the SiO, and the formation of $Ta_2O_5$ layer through the resistor heating process or an electron gun process and the formation of a $Si_2$ layer through the resistor heating process or the electron gun process are repeated. In such a reflection-preventive film, the improvement of the bonding property to the substrate and the reduction of the spectral reflectance are planned.

In the above conventional reflection-preventive film, however, micro cracks occur after repeating a thermal shock test 10 times according to a temperature cycle of (room temperature (20°–25° C.)→−30° C., 60 minutes→room temperature for 30 minutes→80° C. for 60 minutes→room temperature). Furthermore, since $Ta_2O_5$ had a high melting point, when the vacuum deposition is carried out by the electron gun process, the radiation heat is large, and consequently the substrate made from acrylic resin or the like is thermally deformed as in the case of continuous vacuum deposition to degrade the optical accuracy. Moreover, $Ta_2O_5$ is liable to cause splashing (so-called flying, resulting in the adhesion of $Ta_2O_5$ in granular form) to produce a surface defect, and hence there is a problem in the appearance performance.

SUMMARY OF THE INVENTION

It is, therefore, an object of the invention to solve the aforementioned problems of the conventional technique and to provide a reflection-preventive film for optical parts made from a synthetic resin which maintains a good bonding property and a low spectral reflectance and causes no microcrack even after the thermal shock test and is good in appearance performance.

According to the invention, there is the provision of a reflection-preventive film for optical parts of synthetic resin comprising a substrate made from a synthetic resin and four film layers laminated thereon, characterized in that when $\lambda=400-700$ nm, a first film layer viewed from the surface of the substrate is SiO having an optical thickness of 0.6–0.12, a second film layer is $SiO_2$ having an optical thickness of 0.043–0.125$\lambda$, a third film layer is $CeO_2$ having an optical thickness of 0.06–0.625$\lambda$, and a fourth film layer is $SiO_2$ having an optical thickness of 0.165–0.34$\lambda$.

In the invention, acrylic resin, PC (polycarbonate), CR-39 (diethyleneglycol bisacrylcarbonate), AS (acrylonitrilestyrene copolymer resin), PS (polystyrene), PSF (polysulfon) and the like are used as a synthetic resin for the formation of optical parts.

BRIEF DESCRIPTION OF THE DRAWINGS

The invention will be described with reference to the accompanying drawings, wherein:

FIG. 1 is a side view of an embodiment of the reflection-preventive film for optical parts of synthetic resin according to the invention:

FIG. 2 is a schematic view of a vacuum deposition apparatus used in the invention.

DESCRIPTION OF THE PREFERRED EMBODIMENTS

Figure 3:
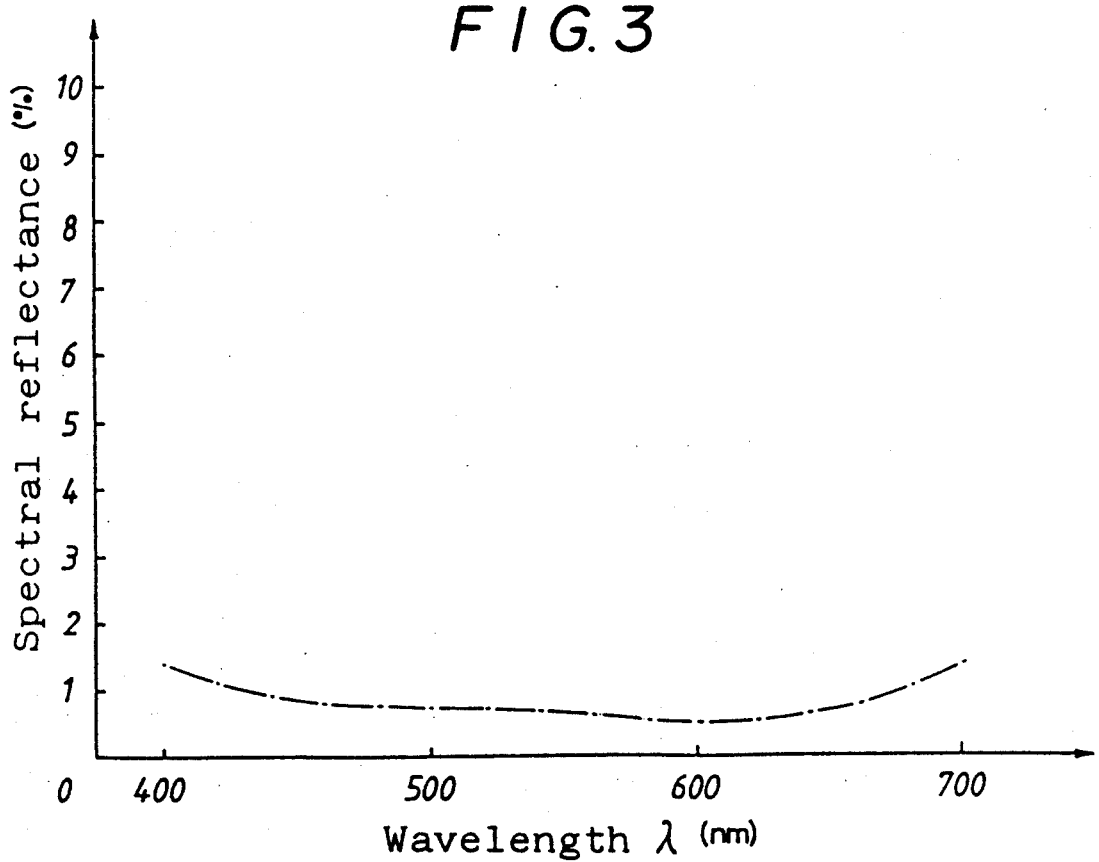
FIGS. 3 to 7 are graphs showing spectral reflectances of first to fifth embodiments, respectively, of the reflection-preventive film according to the invention.

In the reflection-preventive film for an optical part of synthetic resin according to the invention, the first film layer of SiO is formed by high vacuum deposition, and has substantially no absorption action at a wavelength $(\lambda)=400-700$ nm in the case of an extremely-thin layer (nd=not more than 50 nm) and has an excellent bonding property at a refractive index of 1.8, so that the first film layer gives fundamental characteristics of the reflection-preventive film and develops the improvement of the bonding property. Further, the second film layer of $SiO_2$ is formed on the first SiO film layer with a refractive index of 1.47 by high vacuum deposition and develops the improvement of cracking resistance. Therefore, the first and second film layers are a base layer maintaining the bonding property and the cracking resistance.

Moreover, the third film layer of $CeO_2$ is formed by high vacuum deposition and gives the fundamental characteristics of the reflection-preventive film at a refractive index of 1.95. Since the third film layer has tensile stress properties and the first and second film layers have compressive stress properties, even when an $SiO_2$ layer is formed as a fourth film layer, the third film layer acts to provide stress mitigation as an intermediate layer and contributes to improve the cracking resistance.

The reflection-preventive film having a structure shown in FIG. 1 is formed by using a vacuum deposition apparatus shown in FIG. 2.

In FIG. 1, numeral 1 is a substrate made from a synthetic resin. On the surface of the substrate 1 is formed a first film layer 2 of SiO, and a second film layer 3 of $SiO_2$ is formed on the first film layer 2, and a third film layer 4 of $CeO_2$ is formed on the second film layer 3, and further a fourth film layer of SiO₂ is formed on the third film layer 4.

In FIG. 2, numeral 10 is a vacuum chamber. An evaporation source 11 for resistor heating and an evaporation source 12 for an electron gun are disposed at a lower position inside the vacuum chamber 10. Numeral 13 is a molten boat for resistor heating attached to the evaporation source 11, and numeral 14 is a hearth liner of the evaporation source 12 for an electron gun. Further, a rotating dome 15 capable of supporting the synthetic resin substrate 1 such as an acrylic resin lens or the like and rotating in the axial direction is disposed at an upper position inside the vacuum chamber 10. Moreover, numeral 16 is a vacuum discharge pipe connected to a vacuum pump (not shown).

When the reflection-preventive film according to the invention is formed by means of the vacuum deposition apparatus of the above structure, SiO is first placed in the molten boat 13 for resistor heating, while SiO₂ and CeO₂ are separately placed in the hearth liner 14 at different positions, resPectively. Further, the synthetic resin substrate 1 is attached to the rotary dome 15.

Then, the inside of the vacuum chamber 10 is ventilated to a high vacuum degree of more than $1-2\times 10^{-5}$ Torr through the vacuum discharge pipe 16. Next, SiO is evaporated in the boat 13 for resistor heating at room temperature (about 20°-25° C.) and deposited on the surface of the synthetic resin substrate 1 by high vacuum deposition to form a first film layer 2. In this case, it is not required to enclose a gas such as O₂ or the like inside the vacuum chamber 10.

Since out-gas is generated by the above evaporation, the ventillation is continued to render the inside of the vacuum chamber 10 into a given vacuum degree of more than $1-2\times 10^{-5}$ Torr. Thereafter, The evaporation source 12 for the electron gun is actuated at room temperature, whereby SiO₂ is molten and evaporated in the hearth liner 14 to deposit a second film layer 3 of SiO₂ of the first SiO film layer 2. Then, the same evaporation source for the electron gun is actuated and CeO₂ is molten and evaporated in another position of the hearth liner 14 to deposit a third film layer 4 of CeO₂ on the second SiO₂ film layer 3. Finally, a fourth film layer 5 of SiO₂ is deposited on the third CeO₂ film layer 4 in the same manner as in the second film layer 3. Moreover, the formation of the given film layer is carried out after the out-gas generated in the formation of the previous film layer is removed to render the vacuum degree into the given value.

After the completion of the deposition, the slow cooling is carried out for 10 minutes and the inside of the vacuum chamber 10 is rendered into an atmospheric pressure to take out the synthetic resin optical part (lens) having the desired reflection-preventive film from the vacuum chamber 10.

EXAMPLE 1

The reflection-preventive film having a structure shown in the following Table 1 was obtained by the above method.

TABLE 1

|  | Substance | Refractive index n | Optical thickness (nm) |
| --- | --- | --- | --- |
| Fourth layer | SiO₂ | 1.47 | 115 |
| Third layer | CeO₂ | 1.95 | 230 |
| Second layer | SiO₂ | 1.47 | 40 |
| First layer | SiO | 1.80 | 40 |

TABLE 1-continued

|  | Substance | Refractive index n | Optical thickness (nm) |
| --- | --- | --- | --- |
| Synthetic resin substrate | Acrylic resin lens (PMMA) | 1.49 | — |

This reflection-preventive film had a spectral reflectance as shown in FIG. 3. That is, it showed a value of not more than 1% at a wavelength of λ=400–680 nm.

EXAMPLE 2

The reflection-preventive film having a structure shown in the following Table 2 was obtained by the above method.

TABLE 2

|  | Substance | Refractive index n | Optical thickness (nm) |
| --- | --- | --- | --- |
| Fourth layer | SiO₂ | 1.47 | 120 |
| Third layer | CeO₂ | 1.95 | 250 |
| Second layer | SiO₂ | 1.47 | 40 |
| First layer | SiO | 1.80 | 40 |
| Synthetic resin substrate | Acrylic resin lens (PMMA) | 1.49 | — |

Figure 4:
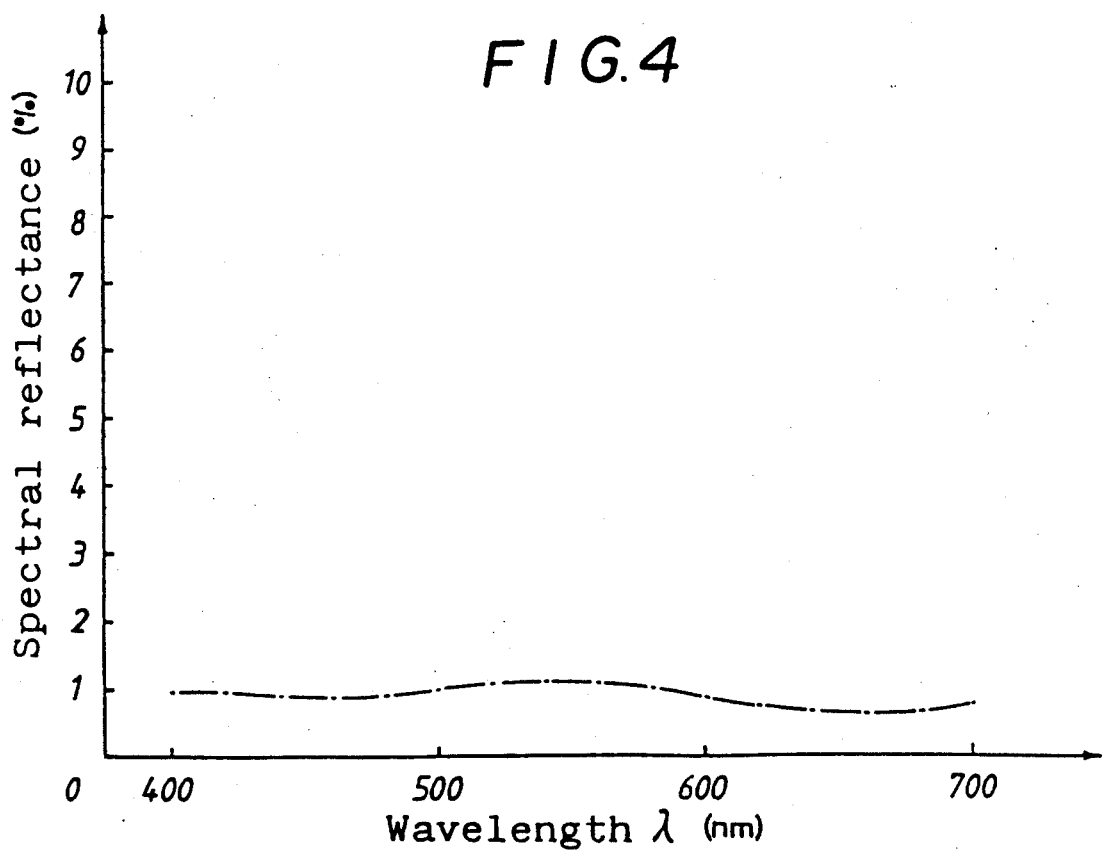

This reflection-preventive film had a spectral reflectance as shown in FIG. 4. That is, it showed a value of not more than 1% at a wavelength of λ=400–700 nm.

EXAMPLE 3

The reflection-preventive film having a structure shown in the following Table 3 was obtained by the above method.

TABLE 3

|  | Substance | Refractive index n | Optical thickness (nm) |
| --- | --- | --- | --- |
| Fourth layer | SiO₂ | 1.47 | 135 |
| Third layer | CeO₂ | 1.95 | 50 |
| Second layer | SiO₂ | 1.47 | 50 |
| First layer | SiO | 1.80 | 50 |
| Synthetic resin substrate | Acrylic resin lens (PMMA) | 1.49 | — |

Figure 5:
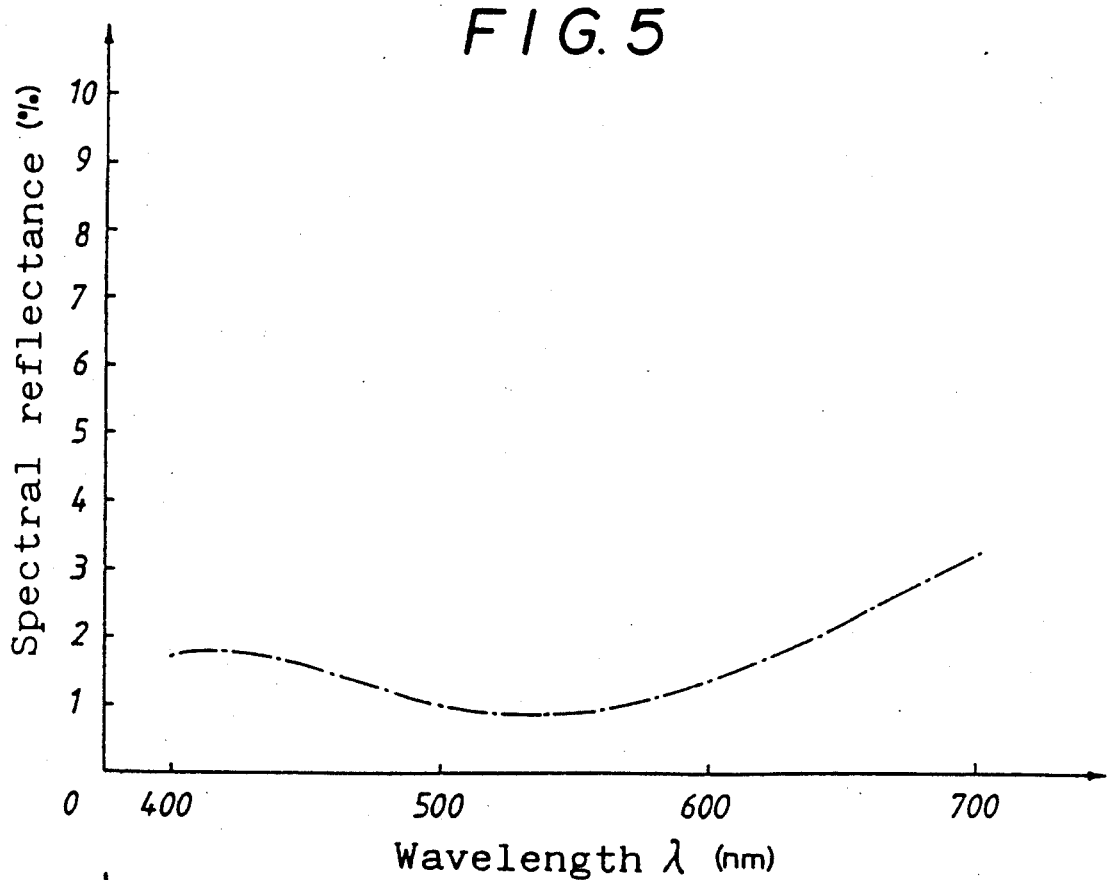

This reflection-preventive film had a spectral reflectance as shown in FIG. 5. That is, it showed a value of minimum spectral reflectance of not more than 0.9% at a wavelength of λ=400–700 nm.

EXAMPLE 4

The reflection-preventive film having a structure shown in the following Table 4 was obtained by the above method.

TABLE 4

|  | Substance | Refractive index n | Optical thickness (nm) |
| --- | --- | --- | --- |
| Fourth layer | SiO₂ | 1.47 | 135 |
| Third layer | CeO₂ | 1.95 | 50 |
| Second layer | SiO₂ | 1.47 | 30 |
| First layer | SiO | 1.80 | 50 |
| Synthetic resin | Acrylic resin lens | 1.49 | — |

TABLE 4-continued

| | Substance | Refractive index n | Optical thickness (nm) |
|---|---|---|---|
| substrate | (PMMA) | | |

Figure 6:
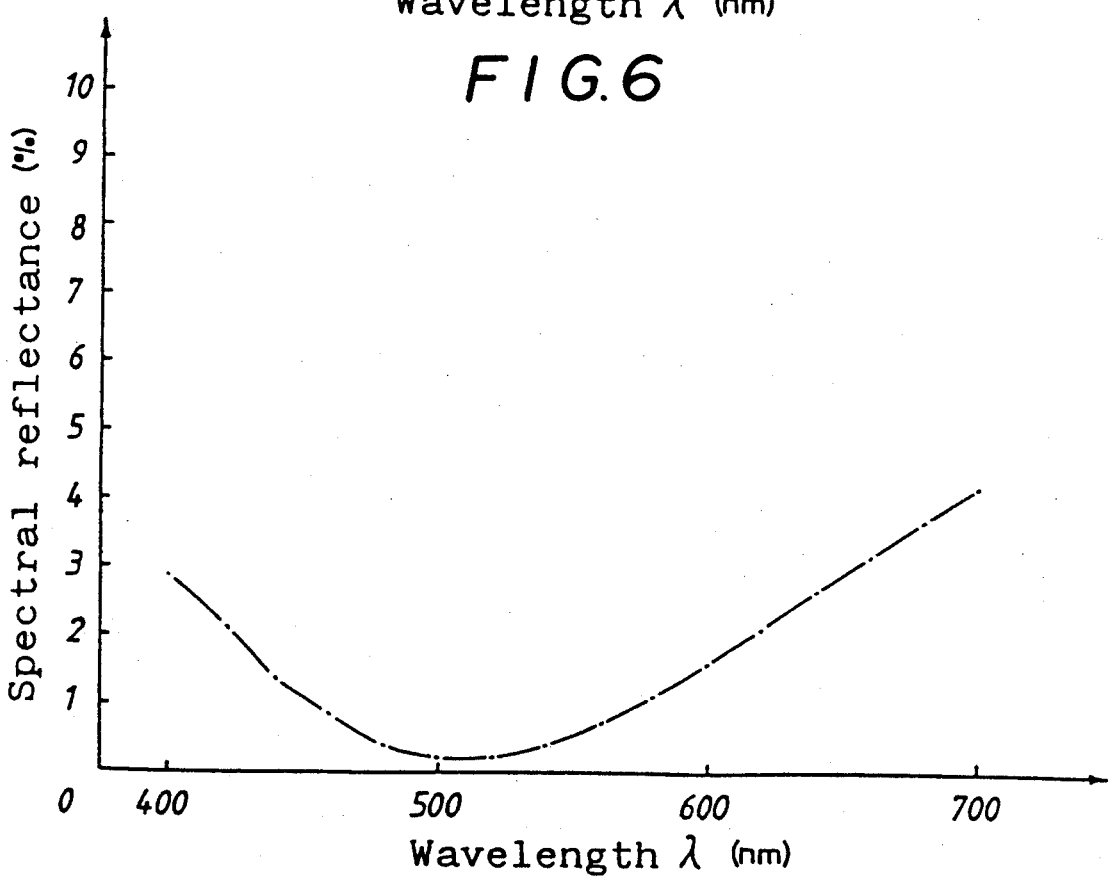

This reflection-preventive film had a spectral reflectance as shown in FIG. 6. That is, it showed a value of minimum spectral reflectance of not more than 0.2% at a wavelength of $\lambda=400$–700 nm.

EXAMPLE 5

The reflection-preventive film having a structure shown in the following Table 5 was obtained by the above method.

TABLE 5

| | Substance | Refractive index n | Optical thickness (nm) |
|---|---|---|---|
| Fourth layer | $SiO_2$ | 1.47 | 135 |
| Third layer | $CeO_2$ | 1.95 | 40 |
| Second layer | $SiO_2$ | 1.47 | 40 |
| First layer | SiO | 1.80 | 40 |
| Synthetic resin substrate | Acrylic resin lens (PMMA) | 1.49 | — |

Figure 7:
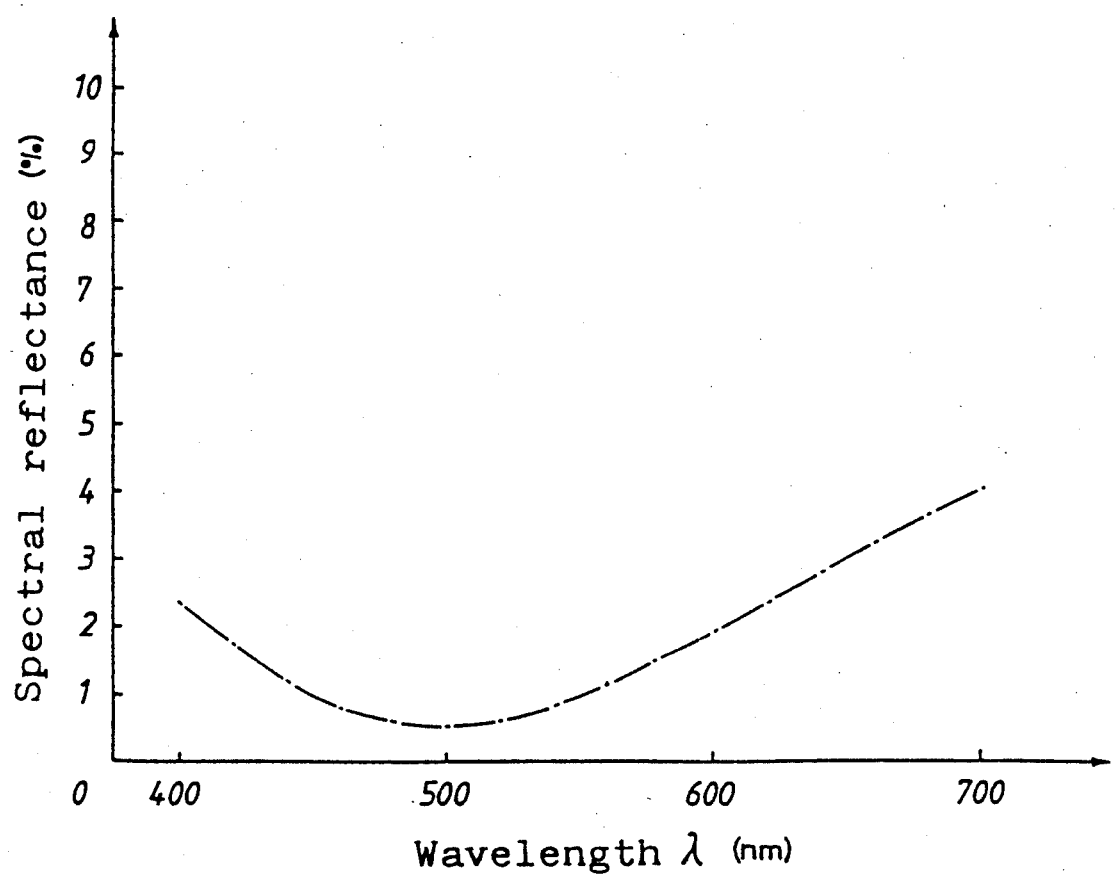

This reflection-preventive film had a spectral reflectance as shown in FIG. 7. That is, it showed a value of minimum spectral reflectance of not more than 0.5% at a wavelength of $\lambda=400$–700 nm.

EXAMPLE 6

The reflection-preventive film having the same structure as in Example 4 was formed on a surface of a substrate made from polycarbonate resin.

The bonding property to the substrate, cracking resistance and surface defect (appearance performance) were evaluated with respect to the reflection-preventive films of Examples 1 to 6. The results are shown in the following Table 6. For the comparison, the same evaluation was made with respect to the conventional reflection-preventive film to obtain results as shown in Table 6.

The test for bonding property was made by putting a pressure sensitive tape (cellophane adhesive tape) of 10 mm in width onto the reflection-preventive film, and then instantly peeling an end of the tape from the film at an angle of 45° C. to observe the peeled state. Further, the cracking resistance was evaluated by the thermal shock test (1 cycle: $+70°$ C.$\rightleftarrows -30°$ C.) 10 cycles to observe the occurence of cracks.

TABLE 6

| Reflection preventive film | Substrate | Cracking resistance (thermal shock) | Surface defect | Bonding property |
|---|---|---|---|---|
| Example 1 | PMMA | | | |
| Example 2 | PMMA | O | O | O |
| Example 3 | PMMA | O | O | O |
| Example 4 | PMMA | O | O | O |
| Example 5 | PMMA | O | O | O |
| Example 6 | PC | O | O | O |
| Comparative Example | PMMA | × | × | Δ |

O; ; good
Δ; excellent
×; bad

As mentioned above, according to the invention, the reflection-preventive film for optical parts of synthetic resin comprises a first film layer of SiO having an optical thickness of 0.06–0.125 $\lambda$, a second film layer of $SiO_2$ having an optical thickness of 0.043–0.125 $\lambda$, a third film layer of $CeO_2$ having an optical thickness of 0.625 $\lambda$ and a fourth film layer of $SiO_2$ having an optical thickness of 0.165–0.34 $\lambda$ at a wavelength of $\lambda=400$–700 nm, so that there is caused no occurrence of microcracks even after the thermal shock test while maintaining the good bonding property to the substrate and a low spectral reflectance and the appearance performance is good.

What is claimed is:

1. An anti-reflective film comprising: a synthetic resin optical substrate, and four film layers laminated on the substrate, the four film layers comprising, for a wavelength of $\lambda=400$–700 nm, a first film layer on a surface of the substrate composed of SiO and having an optical thickness of 0.06–0.125 $\lambda$, a second film layer composed of $SiO_2$ on the first layer and having an optical thickness of 0.043–0.125 $\lambda$, a third film layer composed of $CeO_2$ on the second layer and having an optical thickness of 0.06–0.625 $\lambda$, and a fourth film layer composed of $SiO_2$ on the third layer and having an optical thickness of 0.165–0.34 $\lambda$.

2. The anti-reflective film according to claim 1, wherein said synthetic resin of the substrate is selected from a group consisting of acrylic resin, polycarbonate resin, diethyleneglycol bisacrylcarbonate, acrylonitrile-styrene copolymer resin, polystyrene and polysulfonic resin.

3. An anti-reflective film for use on a synthetic resin optical element, comprising: a first layer composed of SiO and disposable on a surface of a synthetic resin optical element and having an optical thickness of 0.06 to 0.125 $\lambda$ where $\lambda=400$–700 nm, a second layer composed of $CeO_2$ on the first layer and having an optical thickness of 0.043–0.125 $\lambda$ where $\lambda=400$–700 nm; a third layer composed of $CeO_2$ on the second layer and having an optical thickness of 0.06 to 0.625 $\lambda$ where $\lambda=400$–700 nm; and a fourth layer composed of $SiO_2$ on the third layer and having an optical thickness of 0.165–0.34 $\lambda$ where $\lambda=400$–700 nm.

4. The film according to claim 3, wherein the first layer has an optical thickness of from 40 to 50 nm, the second from 30 to 50 nm, the third from 40 to 250 nm and the fourth from 115 to 135 nm.

* * * * *